(12) United States Patent
Fang et al.

(10) Patent No.: US 12,206,248 B2
(45) Date of Patent: Jan. 21, 2025

(54) GRID-CONNECTED CONTROL METHOD AND SYSTEM FOR GRID-FORMING CONVERTER WITHOUT GRID-SIDE VOLTAGE SENSOR

(71) Applicant: Shandong University, Jinan (CN)

(72) Inventors: Jingyang Fang, Jinan (CN); Wenrui Li, Jinan (CN); Wenjia Si, Jinan (CN); Tao Xu, Jinan (CN); Feng Gao, Jinan (CN)

(73) Assignee: Shandong University, Jinan (CN)

( * ) Notice: Subject to any disclaimer, the term of this patent is extended or adjusted under 35 U.S.C. 154(b) by 0 days.

(21) Appl. No.: 18/620,094

(22) Filed: Mar. 28, 2024

(65) Prior Publication Data

US 2024/0364116 A1 Oct. 31, 2024

(30) Foreign Application Priority Data

Apr. 26, 2023 (CN) .............................. 202310491536

(51) Int. Cl.
*H02J 3/44* (2006.01)
*H02M 7/5387* (2007.01)

(52) U.S. Cl.
CPC ........... *H02J 3/44* (2013.01); *H02M 7/53871* (2013.01)

(58) Field of Classification Search
CPC ................. H02J 3/38–388; H02J 3/44; H02M 7/5387–53876
See application file for complete search history.

(56) References Cited

U.S. PATENT DOCUMENTS

2022/0077688 A1* 3/2022 Patarroyo ................. H02J 3/46

FOREIGN PATENT DOCUMENTS

| CN | 103116074 A | * | 5/2013 | |
| CN | 107257136 A | * | 10/2017 | |
| CN | 112039123 B | * | 10/2021 | ............... H02J 3/38 |

OTHER PUBLICATIONS

Zhu, H. et al., "Grid synchronization control without AC voltage sensors," IEEE Applied Power Elec Conf and Expo 2003 (APEC '03), Miami Beach, FL, USA, Feb. 9-13, 2003, vol. 1, pp. 172-178, doi: 10.1109/APEC.2003.1179210. Obtained on Aug. 25, 2024. (Year: 2003).*

(Continued)

Primary Examiner — Fred E Finch, III
(74) Attorney, Agent, or Firm — Weiss & Moy, PC; Jeffrey D. Moy

(57) ABSTRACT

The present disclosure pertains to the field of power electronics technologies, and provides a grid-connected control method and system for a grid-forming converter without a grid-side voltage sensor. The grid-connected control method includes: performing coordinate transformation on a phase of a three-phase capacitor voltage sampled by a phase-locked loop (PLL) to obtain a first phase; in response to control of a first pulse width modulation (PWM) pulse signal, introducing a reference phase, and performing negative feedback regulation on a difference between the reference phase and the first phase to obtain a second phase; and in response to control of a second PWM pulse signal, performing a modulo operation on a difference between the reference phase and the second phase to obtain a third phase, where the third phase is used to replace a phase of the PLL to perform coordinate transformation of a system.

20 Claims, 8 Drawing Sheets

(56) References Cited

OTHER PUBLICATIONS

Boyra, M. et al., "A review on synchronization methods for grid-connected three-phase VSC under unbalanced and distorted conditions," Proceedings of the 2011 14th European Conference on Power Electronics and Applications, Birmingham, UK, Aug. 30-Sep. 1, 2011, pp. 1-10. (Year: 2011).*

Hoff, B. et al., "Sensorless control with startup procedure and grid fault detection for three-phase VSI with LCL filter," IECON 2012, Montreal, QC, Canada, Oct. 25-28, 2012, pp. 3481-3486, doi: 10.1109/IECON.2012.6389340. Obtained on Aug. 26, 2024. (Year: 2012).*

Kukkola, J. et al., "State observer for grid-voltage sensorless control of a grid-connected converter equipped with an LCL filter," 16th Eur Conf Power Elec App, Lappeenranta, Finland, 2014, pp. 1-10, doi: 10.1109/EPE.2014.6910740. Obtained on Aug. 28, 2024. (Year: 2014).*

Pérez-Estévez, D. et al., "Grid-Tied Inverter With AC Voltage Sensorless Synchronization and Soft Start," in IEEE Transactions on Industry Applications, vol. 55, No. 5, pp. 4920-4933, Sep.-Oct. 2019, doi: 10.1109/TIA.2019.2921707. Obtained on Aug. 25, 2024. (Year: 2019).*

Song et al., "Positive and Negative Sequence Components Separation Control Method for PV Inverters Based on Second-order Generalized Integrator," 4th Int Conf Smart Power & Internet Ener Sys, Beijing, China, Dec. 9-12, 2022, pp. 537-542, doi: 10.1109/SPIES55999.2022.10082063. Obtained on Aug. 26, 2024. (Year: 2022).*

He, S. et al., "Line Voltage Sensorless Control of Grid-Connected Inverters Using Multisampling," in IEEE Trans on Power Elec, vol. 37, No. 4, pp. 4792-4803, Apr. 2022, doi: 10.1109/TPEL.2021.3123786. Obtained on Aug. 26, 2024. (Year: 2022).*

Machine translation of CN-103116074-A. Obtained from internal USPTO database on Aug. 29, 2024. (Year: 2013).*

Machine translation of CN-107257136-A. Obtained from internal USPTO database on Aug. 29, 2024. (Year: 2017).*

Machine translation of CN-112039123-B. Obtained from internal USPTO database on Aug. 29, 2024. (Year: 2021).*

* cited by examiner

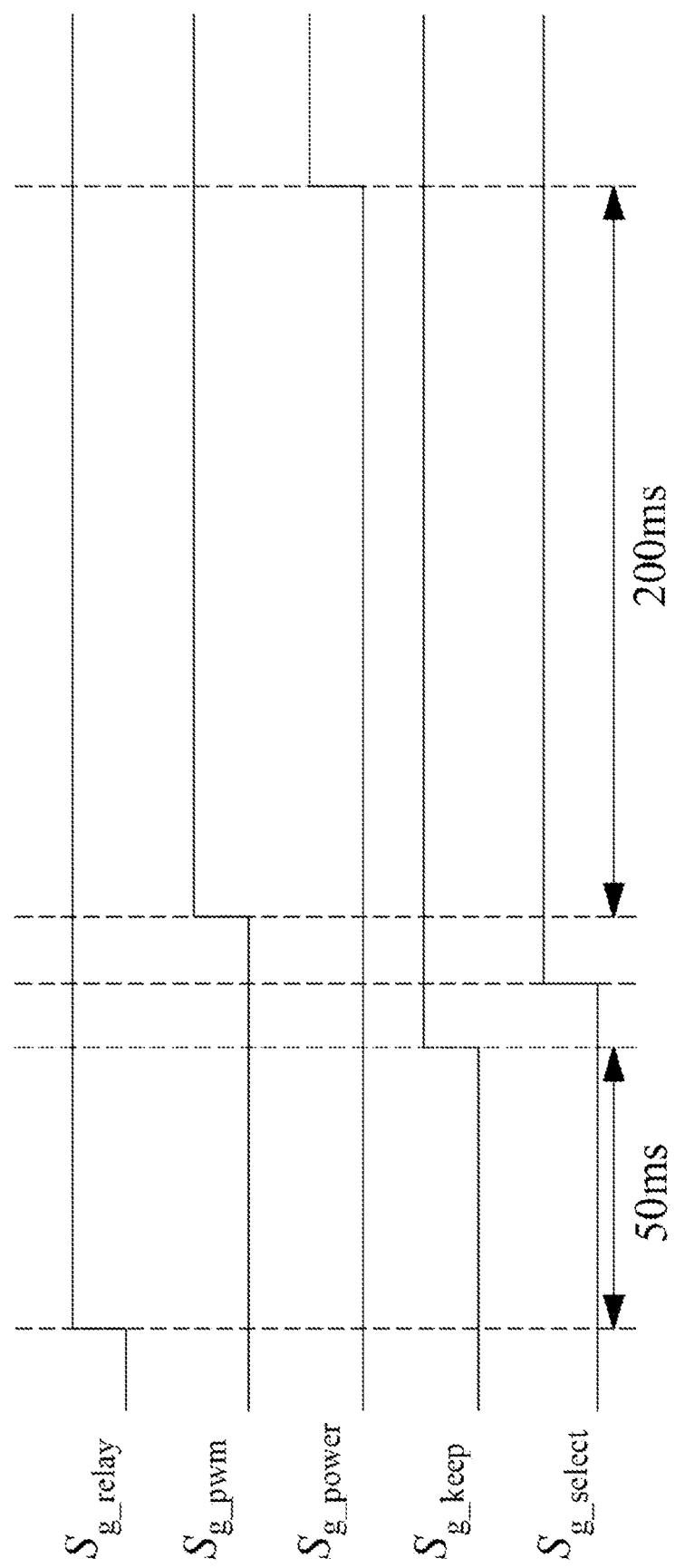

GRID-CONNECTED CONTROL METHOD AND SYSTEM FOR GRID-FORMING CONVERTER WITHOUT GRID-SIDE VOLTAGE SENSOR

CROSS REFERENCE TO RELATED APPLICATION

This patent application claims the benefit and priority of Chinese Patent Application No. 2023104915367, filed with the China National Intellectual Property Administration on Apr. 26, 2023, the disclosure of which is incorporated by reference herein in its entirety as part of the present application.

TECHNICAL FIELD

The present disclosure pertains to the field of power electronics technologies, and mainly relates to a grid-connected control method and system for a grid-forming converter without a grid-side voltage sensor.

BACKGROUND

This section is merely intended to provide background information related to the present disclosure, and does not necessarily constitute the conventional technology.

Three-phase grid-connected converters are widely used in new energy power generation and energy storage systems. A grid-forming grid-connected converter is widely concerned because of its voltage and frequency adjustment capability. In addition, a grid-forming grid-connection technology can provide grid auxiliary services such as inertia and damping for a grid.

In a starting process of a conventional grid-forming grid-connection technology, it is necessary to use a phase-locked loop (PLL) to acquire a voltage at a point of common coupling (PCC), and an amplitude and a phase of the voltage are extracted to implement grid connection. In addition, the grid-forming converter needs to acquire and control an alternating current (AC) capacitor voltage. In this case, a three-phase grid-forming converter needs at least six AC voltage sensors, which inevitably increases a volume, costs, and a weight of a grid-connected converter system.

SUMMARY

To resolve a technical problem in the foregoing background, the present disclosure provides a grid-connected control method and system for a grid-forming converter without a grid-side voltage sensor. In the present disclosure, before the grid-forming converter is connected to a grid, a phase of a grid voltage can be stably generated by replacing a phase of a PLL with a constructed phase, and a voltage sensor at a PCC is removed. In comparison with a conventional grid-forming grid-connection technology, at least three voltage sensors are saved, a system structure is simplified, system costs, a system volume, and a system weight are reduced, and there is an advantage of simple implementation.

To achieve the above objective, the present disclosure adopts the following technical solutions:

A first aspect of the present disclosure provides a grid-connected control method for a grid-forming converter without a grid-side voltage sensor.

The grid-connected control method for a grid-forming converter without a grid-side voltage sensor is applied to a three-phase AC relay in a turned-on state and includes:
performing coordinate transformation on a phase of a three-phase capacitor voltage sampled by a PLL to obtain a first phase;
in response to control of a first pulse width modulation (PWM) pulse signal, introducing a reference phase, and performing negative feedback regulation on a difference between the reference phase and the first phase to obtain a second phase; and
in response to control of a second PWM pulse signal, performing a modulo operation on a difference between the reference phase and the second phase to obtain a third phase, where the third phase is used to replace a phase of the PLL to perform coordinate transformation of a system.

Further, a process of obtaining the third phase further includes:
in response to control of a third PWM pulse signal, introducing an active phase, and performing a modulo operation on a phase value obtained by adding the active phase to the reference phase and subtracting the second phase, to obtain the third phase.

Further, the third PWM pulse signal indicates that: a PWM waveform generator switch that controls a PWM waveform generator, a control switch that controls whether to select the second phase, a switch for selecting a coordinate transformation phase source that controls whether to select the third phase, and an active power controller switch that controls whether to select to introduce the active phase are all turned on. (It should be noted in detail that when a control signal of the control switch of the second phase is set to 1, an input phase difference keeps unchanged. When the control signal of the control switch the second phase is set to 0, a phase difference varies with an input signal.)

Further, the first PWM pulse signal indicates that: a PWM waveform generator switch that controls a PWM waveform generator, a control switch that controls whether to select the second phase, and a switch for selecting a coordinate transformation phase source that controls whether to select the third phase are all turned off.

Further, the first PWM pulse signal indicates that: a PWM waveform generator switch that controls a PWM waveform generator, a control switch that controls whether to select the second phase, a switch for selecting a coordinate transformation phase source that controls whether to select the third phase, and an active power controller switch that controls whether to select to introduce the active phase are all turned off.

Further, the second PWM pulse signal indicates that: a PWM waveform generator switch that controls a PWM waveform generator is turned off, and both a control switch that controls whether to select the second phase and a switch for selecting a coordinate transformation phase source that controls whether to select the third phase are turned on.

Further, the second PWM pulse signal indicates that: both a PWM waveform generator switch that controls a PWM waveform generator and an active power controller switch that controls whether to select to introduce the active phase are turned off, and both a control switch that controls whether to select the second phase and a switch for selecting a coordinate transformation phase source that controls whether to select the third phase are turned on.

Further, before the phase of the three-phase capacitor voltage sampled by the PLL is obtained, the method includes: turning off a PWM waveform generator switch that controls a PWM waveform generator, turning on an AC relay, applying a grid voltage to a three-phase capacitor, and charging the capacitor for a period of time, such that a phase-locked capacitor voltage of the PLL is equivalent to a phase-locked grid voltage.

Further, a process of the performing coordinate transformation on a phase of a three-phase capacitor voltage sampled by a PLL is completed under control of no PWM pulse signal. (It should be noted in detail that the coordinate transformation for obtaining the first phase is not coordinate transformation in a conventional sense. The PLL usually takes a modulo of $2\pi$ internally to output a phase used for the coordinate transformation of the system. The first phase is a value before taking a modulo of $2\pi$.)

A second aspect of the present disclosure provides a grid-connected control system for a grid-forming converter without a grid-side voltage sensor.

The grid-connected control system for a grid-forming converter without a grid-side voltage sensor includes:
- a coordinate transformation module configured to perform coordinate transformation on a phase of a three-phase capacitor voltage sampled by a PLL to obtain a first phase;
- a first PWM control module configured to: in response to control of a first PWM pulse signal, introduce a reference phase, and perform negative feedback regulation on a difference between the reference phase and the first phase to obtain a second phase; and
- a second PWM control module configured to: in response to control of a second PWM pulse signal, perform a modulo operation on a difference between the reference phase and the second phase to obtain a third phase, where the third phase is used to replace a phase of the PLL to perform coordinate transformation of a system.

A third aspect of the present disclosure provides a computer-readable storage medium.

The computer-readable storage medium stores a computer program, and the program is executed by a processor to implement the steps in the grid-connected control method for a grid-forming converter without a grid-side voltage sensor according to the first aspect.

A fourth aspect of the present disclosure provides a computer device.

The computer device includes a memory, a processor, and a computer program stored in the memory and executable on the processor, and the processor implements the steps in the grid-connected control method for a grid-forming converter without a grid-side voltage sensor according to the first aspect when executing the program.

Compared with the conventional technology, the present disclosure has the following beneficial effects:

In the present disclosure, before the grid-forming converter is connected to the grid, the phase of the grid voltage can be stably generated by replacing the phase of the PLL with the constructed phase, and the voltage sensor at the PCC is removed. In comparison with the conventional grid-forming grid-connection technology, at least three voltage sensors are saved, the system structure is simplified, a calculation amount is reduced, and universality is available.

According to the grid-connected control method and system for a grid-forming converter without a grid-side voltage sensor in the present disclosure, a grid is controlled by replacing the phase of the PLL with the constructed phase. Phase locking and control of a filtered capacitor voltage can be implemented only by using three voltage sensor modules. This can greatly reduce system costs, simplify the system structure, and reduce a system volume and a system weight.

BRIEF DESCRIPTION OF THE DRAWINGS

The accompanying drawings of the specification constitute a part of the present disclosure and serve to provide further understanding of the present disclosure, and illustrative embodiments of the present disclosure and the description of the illustrative embodiments serve to explain the present disclosure and are not to be construed as unduly limiting the present disclosure.

FIG. 5 is a schematic diagram of a control structure of a three-phase grid-forming grid-connected converter when a PWM waveform generator is turned on;

FIG. 8 is a diagram of a grid-connection control time sequence of a three-phase grid-forming grid-connected converter according to an embodiment of the present disclosure.

DETAILED DESCRIPTION OF THE EMBODIMENTS

The present disclosure is described in further detail below with reference to the accompanying drawings and embodiments.

It should be noted that the following detailed description is exemplary and aims to further describe the present disclosure. All technical and scientific terms used in this specification have the same meaning as commonly understood by those of ordinary skill in the art to which the present disclosure belongs unless otherwise defined.

It should be noted that terms used herein are merely for describing particular implementations and are not intended to limit illustrative implementations according to the present disclosure. As used herein, unless otherwise explicitly indicated in the context, the singular forms are also intended to include the plural forms. In addition, it should also be understood that when the terms "comprise" and/or "include" are used in the specification, they specify the presence of features, steps, operations, devices, components, and/or combinations thereof.

It should be noted that the accompanying drawings illustrate system structures, functions, and operations, which may be realized according to methods and systems in the various embodiments of the present disclosure. It should be noted that each block in flowcharts or block diagrams may represent a module, a program segment, or a part of code, and the module, the program segment, or the part of the code may include one or more executable instructions for implementing logical functions specified in all the embodiments. It should also be noted that in some alternative implementations, the functions noted in the blocks may also occur in sequences different from those in the accompanying drawings. For example, the functions represented by two continuous blocks may be actually implemented basically in parallel, or sometimes implemented in reverse sequences, which depends on the involved functions. It should also be noted that, each block in the flowcharts and/or the block diagrams, and combinations of the blocks in the flowcharts and/or the block diagrams may be realized by using dedicated hardware-based systems that implement the specified functions or operations, or may be realized by using combinations of dedicated hardware and computer instructions.

Embodiment 1

Figure 1:
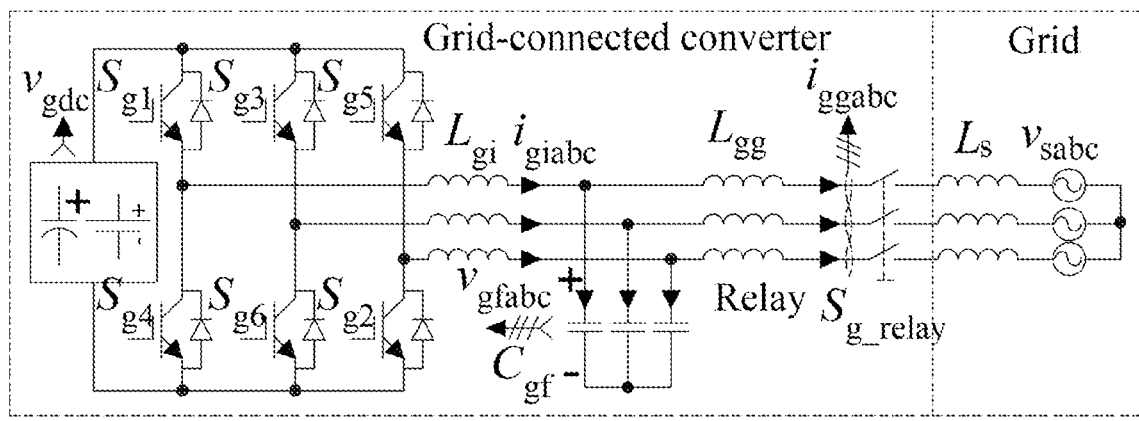
FIG. 1 is a schematic diagram of a circuit structure of a three-phase grid-forming grid-connected converter.

As shown in FIG. 1, this embodiment provides a grid-connected control method for a grid-forming converter without a grid-side voltage sensor. The method includes the following steps:

The grid-connected control method for a grid-forming converter without a grid-side voltage sensor is applied to a three-phase AC relay in a turned-on state and includes:

performing coordinate transformation on a phase of a three-phase capacitor voltage sampled by a PLL to obtain a first phase;

in response to control of a first PWM pulse signal, introducing a reference phase, and performing negative feedback regulation on a difference between the reference phase and the first phase to obtain a second phase; and in response to control of a second PWM pulse signal, performing a modulo operation on a difference between the reference phase and the second phase to obtain a third phase, where the third phase is used to replace a phase of the PLL to perform coordinate transformation of a system.

In a process of switching the grid-forming converter from an off-grid mode to a grid-connected mode, it is necessary to use the PLL to track a phase of a grid voltage to implement synchronization. Usually, the grid-forming converter obtains the phase of the grid voltage by using a voltage sensor at a PCC with reference to the PLL. FIG. 1 shows a common three-phase two-level grid-connected converter, including six power semiconductor switches ($S_{g1}$, $S_{g2}$, $S_{g3}$, $S_{g4}$, $S_{g5}$, and $S_{g6}$), one three-phase inductance-capacitance-inductance (LCL) filter (including three inverter-side inductors $L_{gi}$, three grid-side inductors $L_{gg}$, and three filter capacitors $C_{gf}$), and one three-phase AC relay. The three-phase AC relay is controlled by using a switch signal $S_{g\_relay}$: when $S_{g\_relay}=1$, the relay is turned on and connected; or when $S_{g\_relay}=0$, the relay is turned off. In FIG. 1, a three-phase capacitor voltage $V_{gfabc}$ in the LCL filter, a three-phase grid-connected current $i_{ggabe}$ at a grid-connected public connection point, and a direct-current (DC)-side voltage $V_{gdc}$ are sampled to provide information for a controller. In addition, it should be noted that $V_{sabc}$ represents a voltage of a three-phase AC grid and $L_s$ represents an equivalent inductance of the grid.

Figure 2:
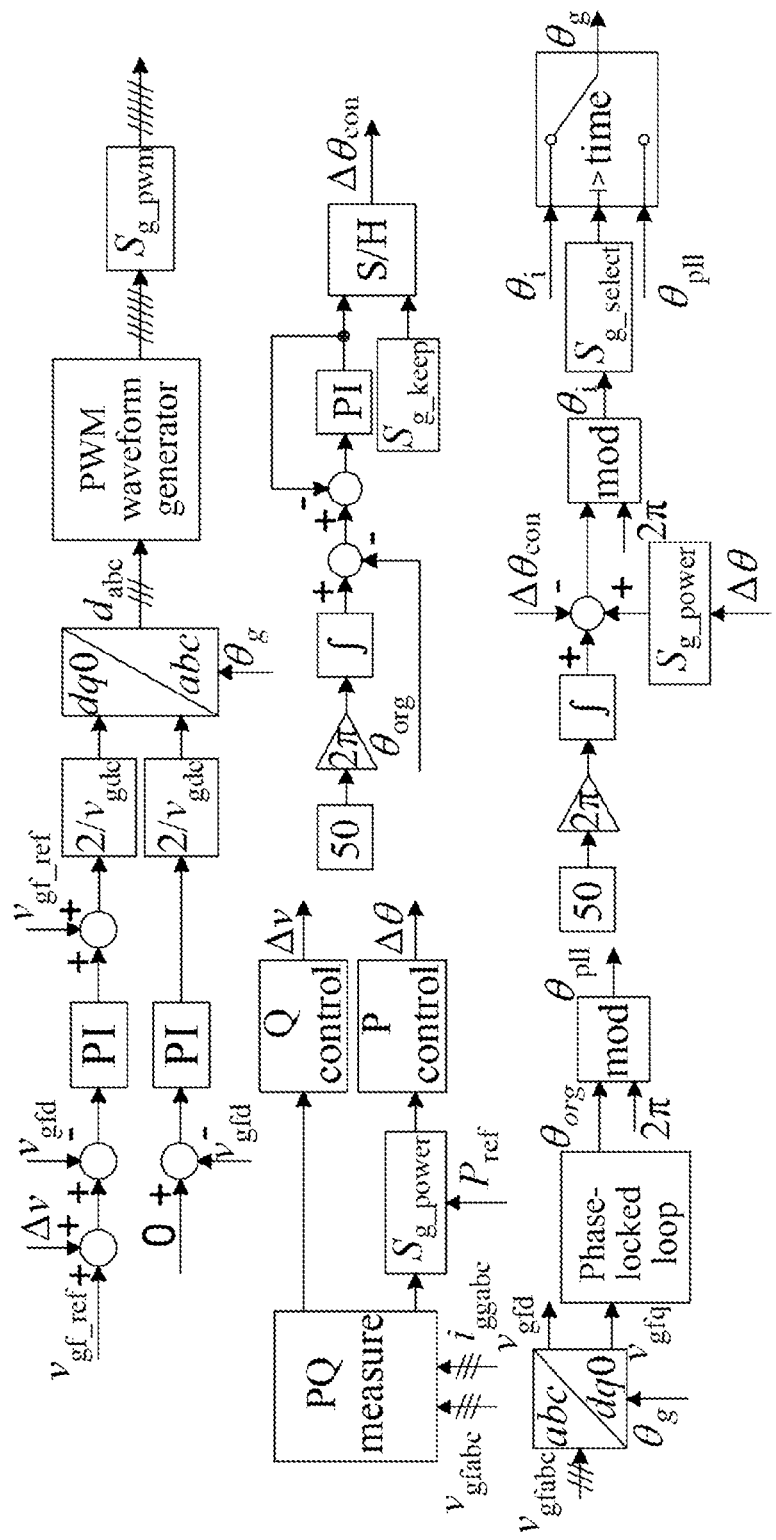
FIG. 2 is a schematic diagram of a control structure of a three-phase grid-forming grid-connected converter.

FIG. 2 shows a control structure of a three-phase grid-forming grid-connected converter. A control objective is to enable capacitor voltage dq-axis components $V_{gfd}$ and $V_{gfq}$ in a dq0 coordinate system to track their command values $V_{gf\_ref}$ and 0 by using a proportional-integral (PI) controller. In the figure, a voltage feed-forward link is added behind a PI controller of a d-axis, to suppress current overshoot during grid connection. Then, a result of a dq-axis is normalized by using a $2/V_{gdc}$ gain link. After coordinate transformation is performed, $d_{abc}$ is generated and sent to a PWM waveform generator to generate a PWM signal. A phase of coordinate transformation performed between an abc three-phase stationary coordinate system and a dq synchronous rotating coordinate system is obtained by sampling a phase of a capacitor voltage by using the PLL, and then constructing an equivalent phase. A stable reference value $\omega_0=2\pi\times50$ is set. Integration of the reference value $\omega 0=2\pi\times50$ is subtracted from a phase pre-processing result $\theta_{org}$ acquired by the PLL to obtain a phase difference. A stable phase follower difference $\Delta\theta_{con}$ is output by using a negative feedback link. A difference between $\Delta\theta_{con}$ and the reference value is made and is used to replace the phase of the PLL for output. A PWM waveform generator switch $S_{g\_pwm}$, a switch $S_{g\_select}$ for selecting a coordinate transformation phase source, a control switch $S_{g\_keep}$, and an active power controller switch $S_{g\_power}$ are additional control signals in this embodiment. When $S_{g\_pwm}=1$, generation of a PWM wave is enabled. When $S_{g\_pwm}=0$, a PWM wave is disabled. When $S_{g\_select}=1$, a coordinate transformation phase selects a constructed phase $\theta_i$. When $S_{g\_select}=0$, the coordinate transformation phase selects a phase $\theta_{pll}$ of the capacitor voltage sampled by the PLL. When $S_{g\_keep}=1$, the phase difference $\Delta\theta_{con}$ keeps unchanged. When $S_{g\_keep}=0$, the phase difference $\Delta\theta_{con}$ is determined by an input. When $S_{g\_power}=1$, an active power controller starts to work, and outputs the phase difference $\Delta\theta$ to adjust a phase of the coordinate transformation. When $S_{g\_power}=0$, the active power controller is turned off. In addition, some symbols and modules in FIG. 2 are further described herein. $\Delta v$ is a voltage difference output by a reactive power controller, and is used to adjust a voltage. A sample/hold (S/H) module is an input signal holding module. A mod module is a modulo module.

Figure 3:
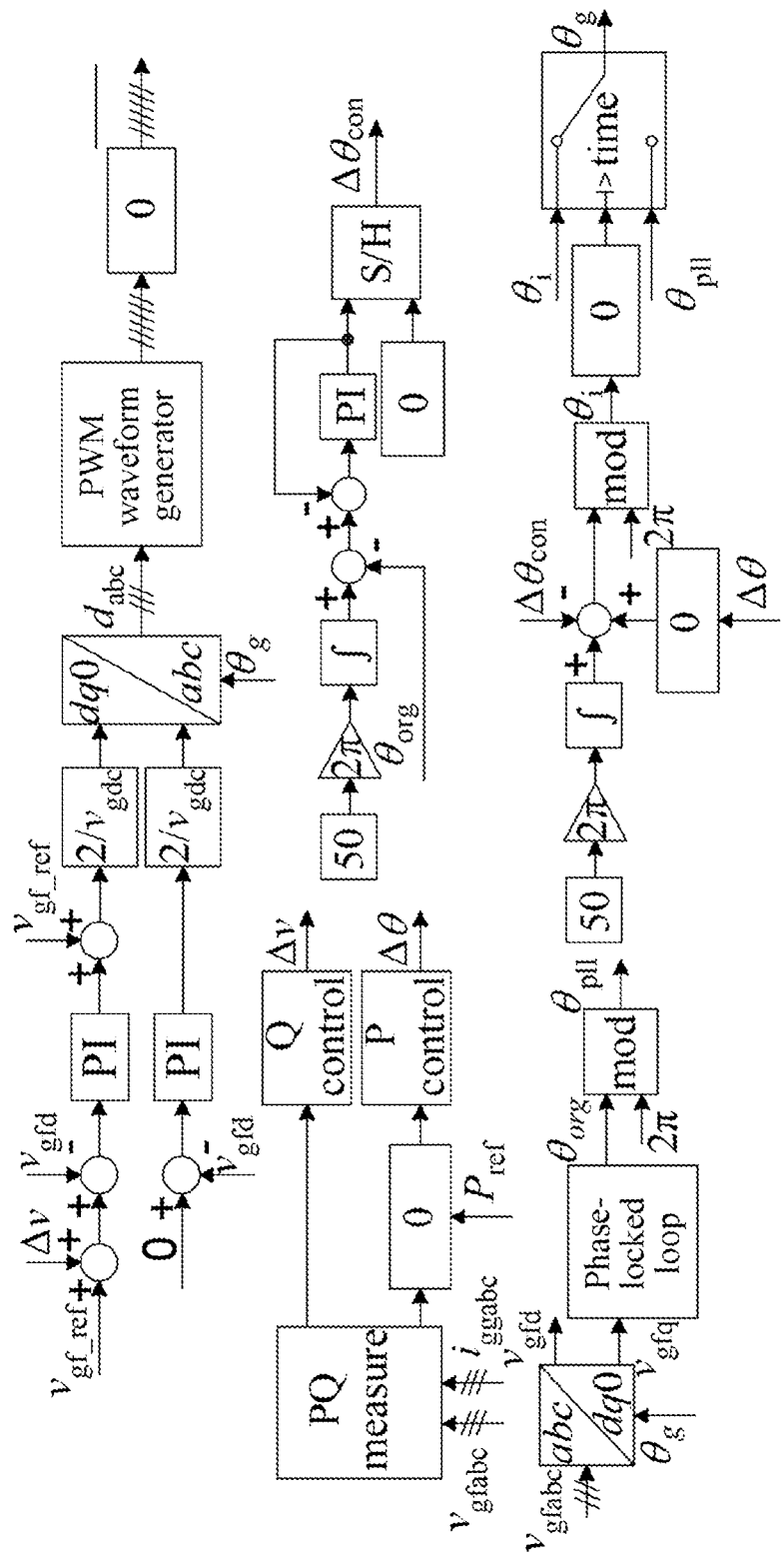
FIG. 3 is a schematic diagram of a control structure of a three-phase grid-forming grid-connected converter when a PLL is used to perform coordinate transformation.

FIG. 3 is a schematic structural diagram of performing coordinate transformation by using a phase of a capacitor voltage sampled by a PLL when a PWM waveform generator is turned off. In this case, $S_{g\_pwm}=0$, a PWM wave is disabled, $S_{g\_keep}=0$, the phase difference $\Delta\theta_{con}$ changes with an input, $S_{g\_select}=0$, and the phase output by the PLL is selected to perform the coordinate transformation. (In this case, $S_{g\_power}=0$ and the active power controller does not work.)

Figure 4:
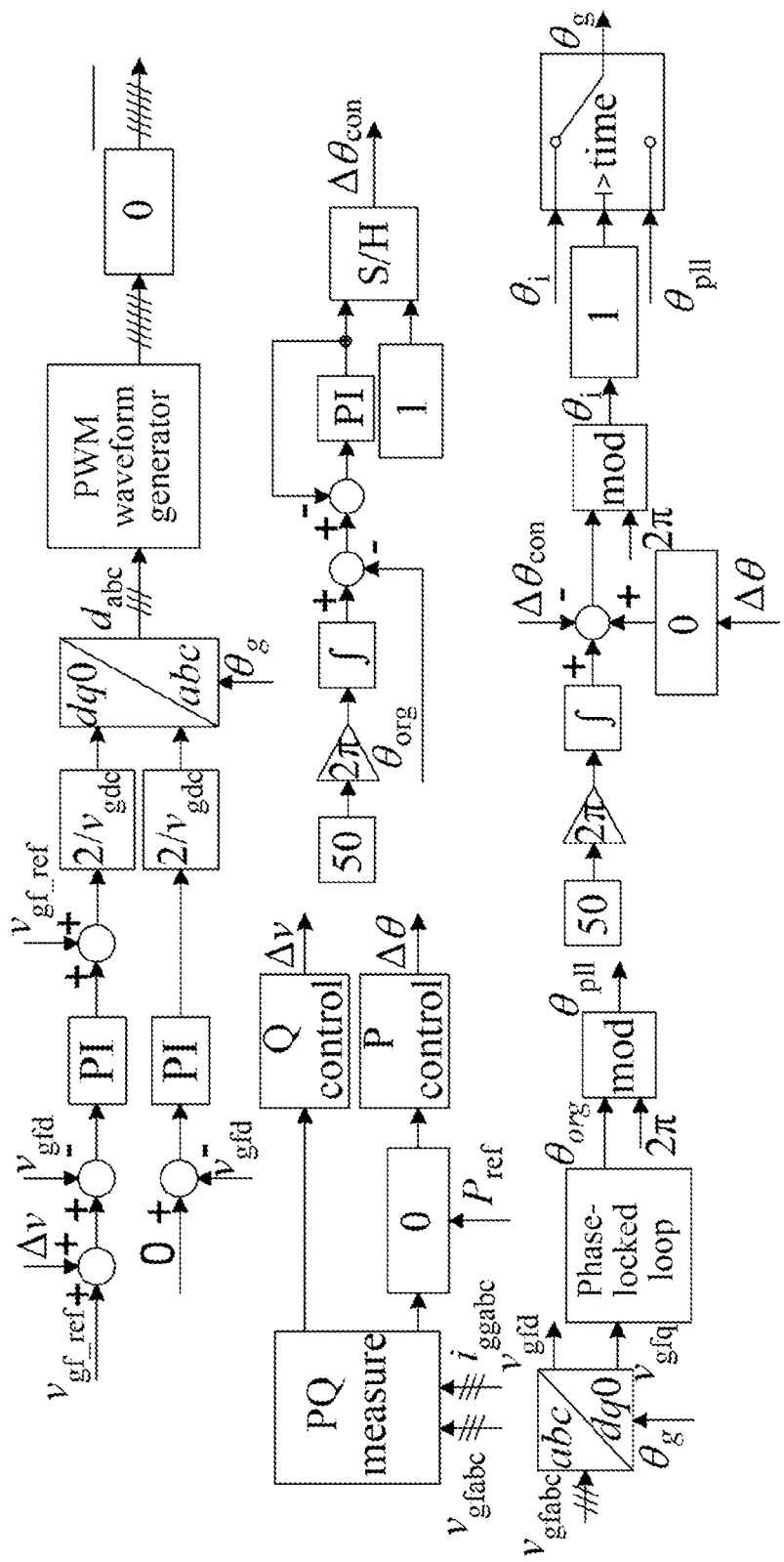
FIG. 4 is a schematic diagram of a control structure of a three-phase grid-forming grid-connected converter when a constructed equivalent phase is switched to perform coordinate transformation.

FIG. 4 is a schematic structural diagram of performing coordinate transformation by using a constructed phase when a PWM waveform generator is turned off. In this case, $S_{g\_pwm}=0$, a PWM wave is disabled, $S_{g\_keep}=1$, the phase difference $\Delta\theta_{con}$ keeps unchanged, $S_{g\_select}=1$, and the constructed phase is selected to perform the coordinate transformation. (In this case, $S_{g\_power}=0$ and the active power controller does not work.)

Figure 5:
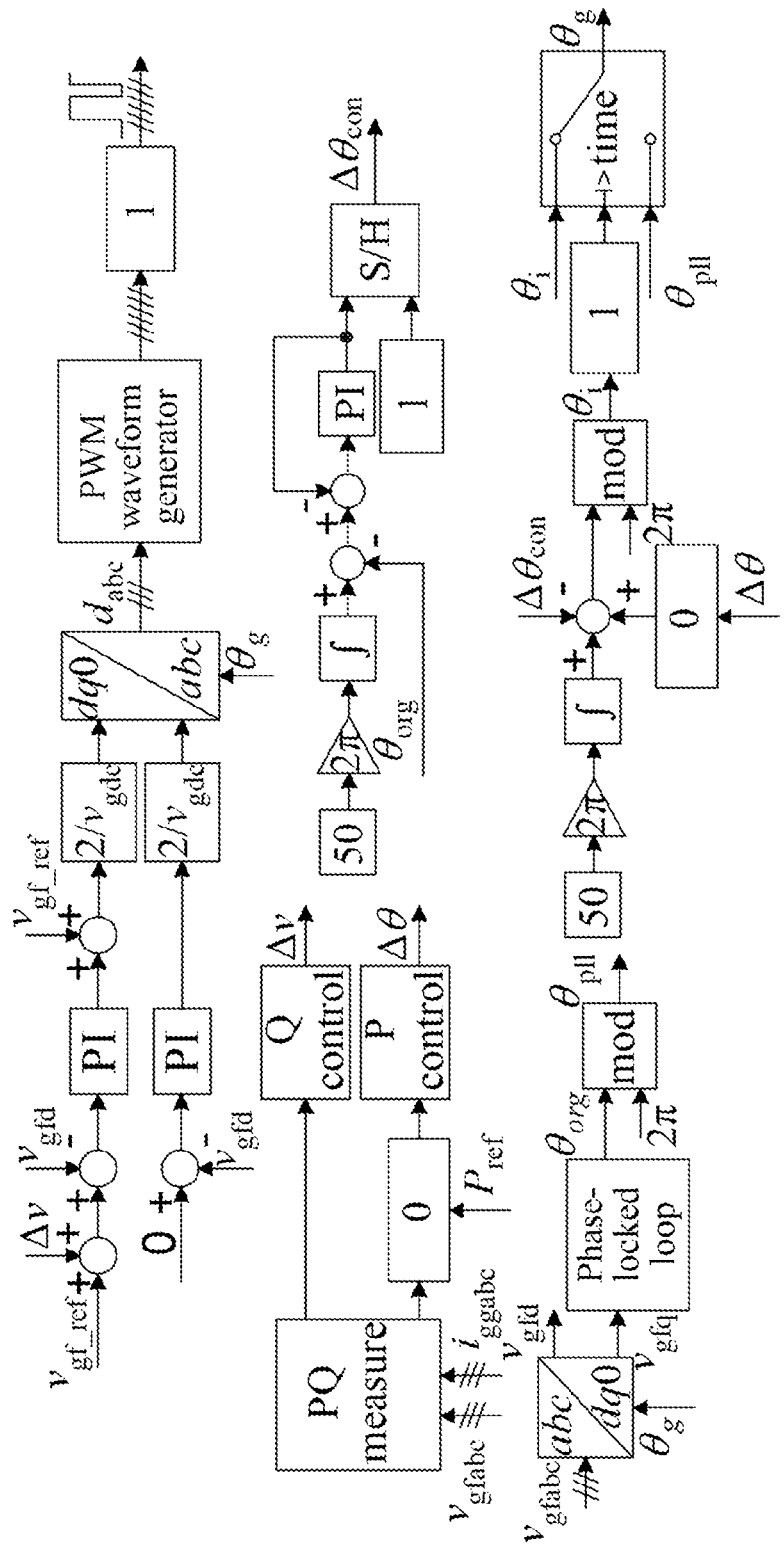

FIG. 5 is a schematic diagram of a control structure in a closed-loop operation mode in which a grid-connected converter enables a PWM wave. In this case, $S_{g\_pwm}=1$, the PWM wave is enabled, $S_{g\_keep}=1$, the phase difference $\Delta\theta_{con}$ keeps unchanged, $S_{g\_select}=1$, a constructed phase is selected to perform coordinate transformation, and the grid-connected converter runs stably in the closed-loop mode. (In this case, $S_{g\_power}=0$ and the active power controller does not work.)

Figure 6:
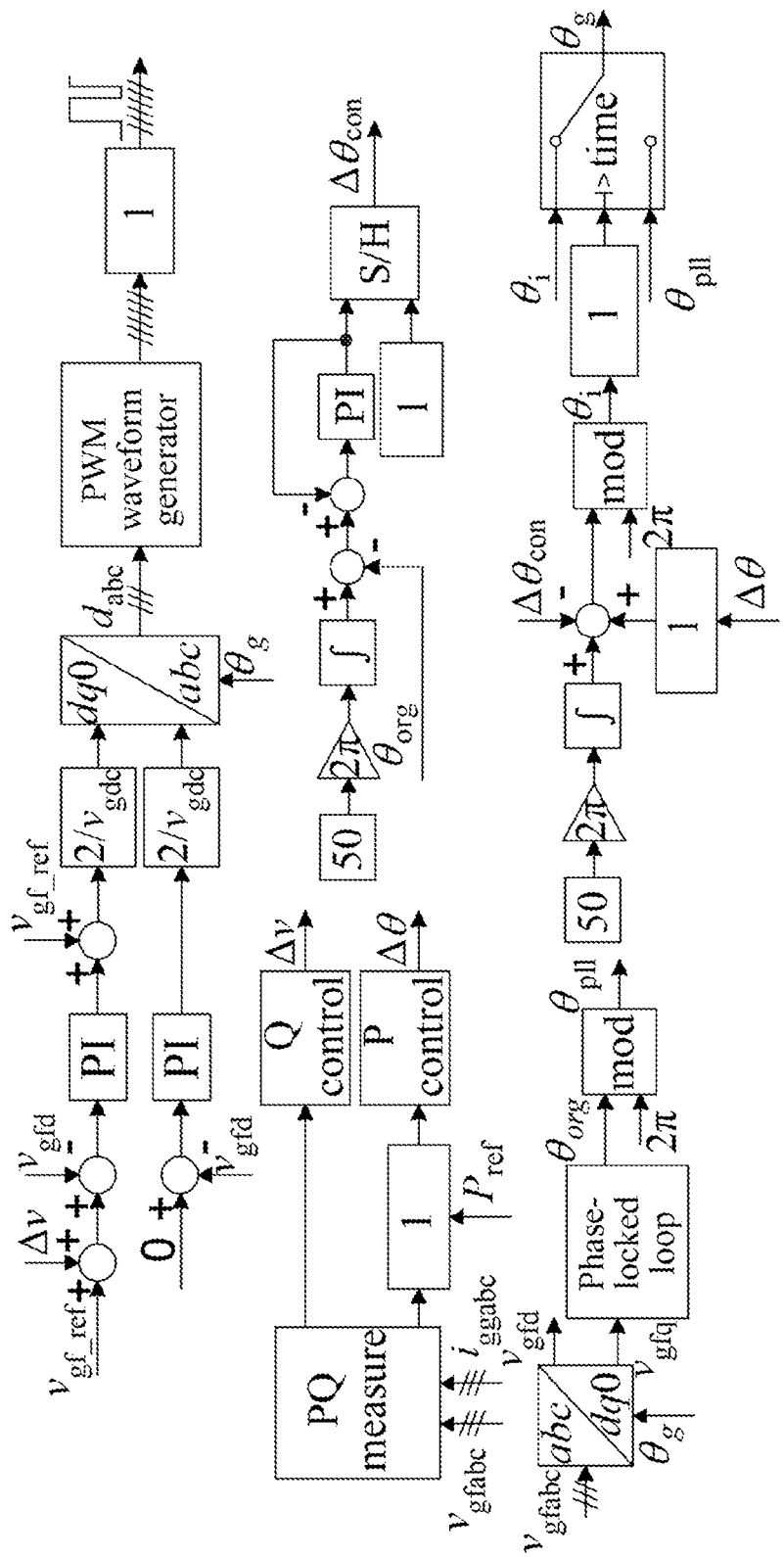
FIG. 6 is a schematic diagram of a control structure of a three-phase grid-forming grid-connected converter when an active power controller is added ($S_{g\_pwm}=1$, and $S_{g\_power}=1$)

FIG. 6 is a schematic diagram of a control structure of a grid-connected converter in a closed-loop operation mode in which an active power controller is added. In this case, $S_{g\_pwm}=1$, a PWM wave is enabled, $S_{g\_keep}=1$, the phase difference $\Delta\theta_{con}$ keeps unchanged, $S_{g\_select}=1$, a constructed phase is selected to perform coordinate transformation, $S_{g\_power}=1$, and the active power controller is configured to adjust a phase.

Figure 7:
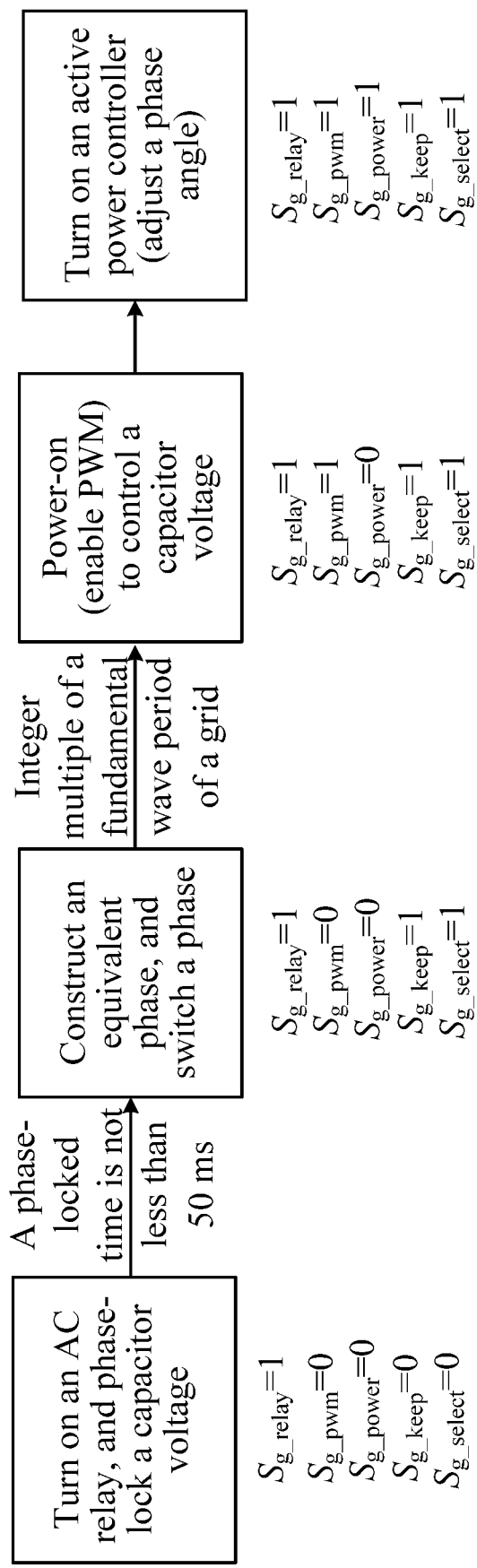
FIG. 7 is a diagram of a grid-connection control logic of a three-phase grid-forming grid-connected converter according to an embodiment of the present disclosure.

As shown in FIG. 7, in the grid-connected control method for a grid-forming converter without a grid-side voltage sensor in this embodiment, a control time sequence is added from turning on an AC relay ($S_{g\_delay}=1$) to adding the active power controller. First, as shown in FIG. 2, in a PWM disabled mode, the AC relay is turned on to run for a period of time to charge a filter capacitor. Then, as shown in FIG. 3, in the PWM disabled mode, running is performed for a period of time by using the phase of the capacitor voltage sampled by the PLL. Next, as shown in FIG. 4, in the PWM disabled mode, a constructed stable phase is switched to run for a period of time. Afterwards, a PWM mode is enabled to run normally as shown in FIG. 5. As shown in FIG. 6, after the grid-connected converter stably runs for a period of time, the active power controller may be added to adjust a phase.

As shown in FIG. 8, a typical time sequence of grid connection control of the grid-forming converter without a grid-side voltage sensor in this embodiment is as follows: First, a PWM wave output is disabled, the AC relay is turned on ($S_{g\_relay}=1$), a time for locking the phase of the capacitor voltage by the PLL is not less than a time for generating a stable phase difference, for example, may be greater than or equal to 40 ms, and 50 ms may be selected to generate a stable control phase constructed by using the PLL ($S_{g\_keep}=1$). Then, coordinate transformation of a system is performed by using the selected constructed phase ($S_{g\_select}=1$), the PWM wave output is enabled ($S_{g\_pwm}=1$), and an active power controller is turned on ($S_{g\_power}=1$) after running is stably performed for 200 ms, to adjust a phase.

In addition, an enabling time of a PWM wave is an integer multiple of a fundamental wave period of a grid.

Embodiment 2

This embodiment provides a grid-connected control system for a grid-forming converter without a grid-side voltage sensor.

The grid-connected control system for a grid-forming converter without a grid-side voltage sensor includes:
  a coordinate transformation module configured to perform coordinate transformation on a phase of a three-phase capacitor voltage sampled by a PLL to obtain a first phase;
  a first PWM control module configured to: in response to control of a first PWM pulse signal, introduce a reference phase, and perform negative feedback regulation on a difference between the reference phase and the first phase to obtain a second phase; and
  a second PWM control module configured to: in response to control of a second PWM pulse signal, perform a modulo operation on a difference between the reference phase and the second phase to obtain a third phase, where the third phase is used to replace a phase of the PLL to perform coordinate transformation of a system.

It should be noted herein that examples and application scenarios implemented by the coordinate transformation module, the first PWM control module, and the second PWM control module are the same as those implemented by the steps in Embodiment 1, but are not limited to the content disclosed in Embodiment 1. It should be noted that the above modules as part of the system can be executed in a computer system, such as a set of computer executable instructions.

Embodiment 3

This embodiment provides a computer-readable storage medium, the computer-readable storage medium stores a computer program, and the program is executed by a processor to implement the steps in the grid-connected control method for a grid-forming converter without a grid-side voltage sensor in Embodiment 1.

Embodiment 4

This embodiment provides a computer device, including a memory, a processor, and a computer program stored in the memory and executable on the processor, and the processor implements the steps in the grid-connected control method for a grid-forming converter without a grid-side voltage sensor in Embodiment 1 when executing the program.

A person skilled in the art should understand that the embodiments of the present disclosure may be provided as a method, a system, or a computer program product. Therefore, the present disclosure may use a form of hardware embodiments, software embodiments, or embodiments with a combination of software and hardware. Moreover, the present disclosure may use a form of a computer program product that is implemented on one or more computer-usable storage media (including but not limited to a disk memory, an optical memory, and the like) that include computer-usable program code.

The present disclosure is described with reference to the flowcharts and/or block diagrams of the method, the device (system), and the computer program product according to the embodiments of the present disclosure. It should be understood that each flow and/or block in the flowchart and/or block diagram and a combination of the flow and/or block in the flowchart and/or block diagram can be implemented by computer program instructions. These computer program instructions may be provided for a processor of a general-purpose computer, a special-purpose computer, an embedded processor, or other programmable data processing devices to produce a machine, so that instructions executed by the processor of the computer or other programmable data processing devices produce an apparatus used for implementing a function specified in one or more flows of the flowchart and/or one or more blocks of the block diagram.

These computer program instructions may also be stored in a computer-readable memory that can guide a computer or other programmable data processing devices to work in a specific manner, so that instructions stored in the computer-readable memory produce an article of manufacture including an instruction apparatus, and the instruction apparatus implements a function specified in one or more flows of the flowchart and/or one or more blocks in the block diagram.

These computer program instructions may also be loaded onto the computer or other programmable data processing devices, so that a series of operating steps are performed on the computer or other programmable devices to generate computer-implemented processing, and instructions executed on the computer or other programmable devices provide steps for implementing a function specified in one or more flows of the flowchart and/or one or more blocks in the block diagram.

Those of ordinary skill in the art may understand that all or some of the procedures in the methods of the foregoing embodiments may be implemented by a computer program instructing related hardware. The program may be stored in a computer-readable storage medium. When the program is executed, the procedures in the embodiments of the foregoing methods may be performed. The storage medium may be a magnetic disk, an optical disc, a read-only memory (ROM), a random access memory (RAM), or the like.

The foregoing are merely preferred embodiments of the present disclosure and are not intended to limit the present disclosure, and various changes and modifications may be made to the present disclosure by a person skilled in the art. Any modification, equivalent substitution, improvement, and the like within the spirit and principles of the present disclosure shall fall within the scope of protection of the present disclosure.

What is claimed is:

1. A grid-connected control method for a grid-forming converter without a grid-side voltage sensor, applied to a three-phase alternating current (AC) relay in a turned-on state and comprising:
performing coordinate transformation on a phase of a three-phase capacitor voltage sampled by a phase-locked loop (PLL) to obtain a first phase;
in response to control of a first pulse width modulation (PWM) pulse signal, introducing a reference phase, and performing negative feedback regulation on a difference between the reference phase and the first phase to obtain a second phase; and
in response to control of a second PWM pulse signal, performing a modulo operation on a difference between the reference phase and the second phase to obtain a third phase, wherein the third phase is used to replace a phase of the PLL to perform coordinate transformation of a system.

2. The grid-connected control method for a grid-forming converter without a grid-side voltage sensor according to claim 1, wherein a process of obtaining the third phase further comprises:
in response to control of a third PWM pulse signal, introducing an active phase, and performing a modulo operation on a phase value obtained by adding the active phase to the reference phase and subtracting the second phase, to obtain the third phase.

3. The grid-connected control method for a grid-forming converter without a grid-side voltage sensor according to claim 2, wherein the third PWM pulse signal indicates that: a PWM waveform generator switch that controls a PWM waveform generator, a control switch that controls whether to select the second phase, a switch for selecting a coordinate transformation phase source that controls whether to select the third phase, and an active power controller switch that controls whether to select to introduce the active phase are all turned on.

4. A non-transitory computer-readable storage medium, wherein the computer-readable storage medium stores a computer program, and the program is executed by a processor to implement the steps in the grid-connected control method for a grid-forming converter without a grid-side voltage sensor according to claim 3.

5. The grid-connected control method for a grid-forming converter without a grid-side voltage sensor according to claim 2, wherein the first PWM pulse signal indicates that: a PWM waveform generator switch that controls a PWM waveform generator, a control switch that controls whether to select the second phase, and a switch for selecting a coordinate transformation phase source that controls whether to select the third phase are all turned off;
or
a PWM waveform generator switch that controls a PWM waveform generator, a control switch that controls whether to select the second phase, a switch for selecting a coordinate transformation phase source that controls whether to select the third phase, and an active power controller switch that controls whether to select to introduce the active phase are all turned off.

6. A non-transitory computer-readable storage medium, wherein the computer-readable storage medium stores a computer program, and the program is executed by a processor to implement the steps in the grid-connected control method for a grid-forming converter without a grid-side voltage sensor according to claim 5.

7. The grid-connected control method for a grid-forming converter without a grid-side voltage sensor according to claim 2, wherein the second PWM pulse signal indicates that: a PWM waveform generator switch that controls a PWM waveform generator is turned off, and both a control switch that controls whether to select the second phase and a switch for selecting a coordinate transformation phase source that controls whether to select the third phase are turned on; or
both a PWM waveform generator switch that controls a PWM waveform generator and an active power controller switch that controls whether to select to introduce the active phase are turned off, and both a control switch that controls whether to select the second phase and a switch for selecting a coordinate transformation phase source that controls whether to select the third phase are turned on.

8. A non-transitory computer-readable storage medium, wherein the computer-readable storage medium stores a computer program, and the program is executed by a processor to implement the steps in the grid-connected control method for a grid-forming converter without a grid-side voltage sensor according to claim 7.

9. A non-transitory computer-readable storage medium, wherein the computer-readable storage medium stores a computer program, and the program is executed by a processor to implement the steps in the grid-connected control method for a grid-forming converter without a grid-side voltage sensor according to claim 2.

10. The grid-connected control method for a grid-forming converter without a grid-side voltage sensor according to claim 1, wherein the first PWM pulse signal indicates that: a PWM waveform generator switch that controls a PWM waveform generator, a control switch that controls whether to select the second phase, and a switch for selecting a coordinate transformation phase source that controls whether to select the third phase are all turned off;
or
a PWM waveform generator switch that controls a PWM waveform generator, a control switch that controls whether to select the second phase, a switch for selecting a coordinate transformation phase source that controls whether to select the third phase, and an active power controller switch that controls whether to select to introduce the active phase are all turned off.

11. A non-transitory computer-readable storage medium, wherein the computer-readable storage medium stores a computer program, and the program is executed by a processor to implement the steps in the grid-connected control method for a grid-forming converter without a grid-side voltage sensor according to claim 10.

12. The grid-connected control method for a grid-forming converter without a grid-side voltage sensor according to claim 1, wherein the second PWM pulse signal indicates that: a PWM waveform generator switch that controls a PWM waveform generator is turned off, and both a control switch that controls whether to select the second phase and a switch for selecting a coordinate transformation phase source that controls whether to select the third phase are turned on; or both a PWM waveform generator switch that controls a PWM waveform generator and an active power controller switch that controls whether to select to introduce the active phase are turned off, and both a control switch that controls whether to select the second phase and a switch for selecting a coordinate transformation phase source that controls whether to select the third phase are turned on.

13. A non-transitory computer-readable storage medium, wherein the computer-readable storage medium stores a computer program, and the program is executed by a processor to implement the steps in the grid-connected control method for a grid-forming converter without a grid-side voltage sensor according to claim 12.

14. The grid-connected control method for a grid-forming converter without a grid-side voltage sensor according to claim 1, wherein before the phase of the three-phase capacitor voltage sampled by the PLL is obtained, the method comprises: turning off a PWM waveform generator switch that controls a PWM waveform generator, turning on an AC relay, applying a grid voltage to a three-phase capacitor, and charging the capacitor for a period of time, such that a phase-locked capacitor voltage of the PLL is equivalent to a phase-locked grid voltage.

15. A non-transitory computer-readable storage medium, wherein the computer-readable storage medium stores a computer program, and the program is executed by a processor to implement the steps in the grid-connected control method for a grid-forming converter without a grid-side voltage sensor according to claim 14.

16. The grid-connected control method for a grid-forming converter without a grid-side voltage sensor according to claim 1, wherein a process of the performing coordinate transformation on a phase of a three-phase capacitor voltage sampled by a PLL is completed under control of no PWM pulse signal.

17. A non-transitory computer-readable storage medium, wherein the computer-readable storage medium stores a computer program, and the program is executed by a processor to implement the steps in the grid-connected control method for a grid-forming converter without a grid-side voltage sensor according to claim 16.

18. A non-transitory computer-readable storage medium, wherein the computer-readable storage medium stores a computer program, and the program is executed by a processor to implement the steps in the grid-connected control method for a grid-forming converter without a grid-side voltage sensor according to any one of claim 1.

19. A computer device, comprising a memory, a processor, and a computer program stored in the memory and executable on the processor, wherein the processor implements the steps in the grid-connected control method for a grid-forming converter without a grid-side voltage sensor according to claim 1 when executing the program.

20. A grid-connected control system for a grid-forming converter without a grid-side voltage sensor, comprising:

a coordinate transformation module configured to perform coordinate transformation on a phase of a three-phase capacitor voltage sampled by a PLL to obtain a first phase;

a first PWM control module configured to: in response to control of a first PWM pulse signal, introduce a reference phase, and perform negative feedback regulation on a difference between the reference phase and the first phase to obtain a second phase; and a second PWM control module configured to: in response to control of a second PWM pulse signal, perform a modulo operation on a difference between the reference phase and the second phase to obtain a third phase, wherein the third phase is used to replace a phase of the PLL to perform coordinate transformation of a system.

\* \* \* \* \*